Figure 1:
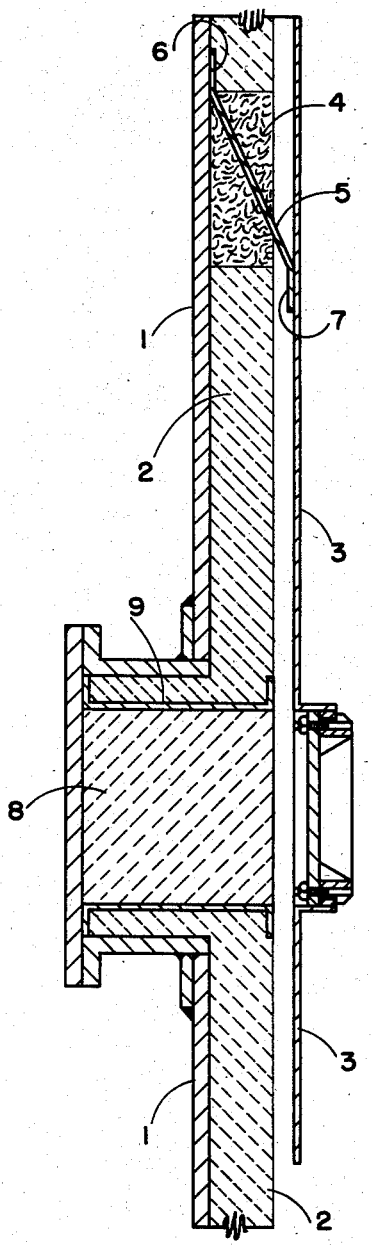

May 8, 1945.   J. G. TRAXLER ET AL   2,375,710
LINING FOR INTERNALLY INSULATED FLUID CONTAINERS
Filed Dec. 21, 1943

John G. Traxler
Paul John, Jr.   INVENTORS.
BY
P. J. Whelan
ATTORNEY.

Patented May 8, 1945

2,375,710

UNITED STATES PATENT OFFICE 2,375,710

LINING FOR INTERNALLY INSULATED FLUID CONTAINERS

John G. Traxler and Paul John, Jr., Baytown, Tex., assignors to Standard Oil Development Company, a corporation of Delaware Application December 21, 1943, Serial No. 515,116

6 Claims. (Cl. 220—14)

The present invention is directed to fluid containers and particularly to those fluid containers such as reaction vessels which are intended to hold high temperature fluids.

For several years industry has used steel vessels for holding fluids whose temperatures are substantially above the safe operating shell metal temperature by providing an internal insulating material. The internal insulation serves a threefold purpose: (1) It reduces the metal temperature of the vessel wall so that higher design stresses may be tolerated, thereby decreasing the thickness of the metal required in the vessel. (2) The reduced shell metal temperature makes possible the use of plain carbon steel shells; otherwise without the internal insulation the use of high alloy steels would be imperative to provide the necessary strength at elevated temperatures. (3) In certain types of installations the lower shell temperatures eliminate the necessity for use of a stainless steel lining to resist various forms of chemical attack which occur at high temperatures, but are not prevalent at the lower temperatures. A common type of such installation consists of a layer, or layers, of high temperature insulating material, such as slag wool, asbestos, or magnesia block, or insulating brick. In order to hold this insulating material in place, to protect it from erosion, deterioration, and/or to protect the insulating material from deleterious effects of the fluid, or vice versa, a layer of refractory tile is commonly placed between the fluid and the insulating material.

In many such installations where appreciable pressure gradient exists, excessively high shell metal temperatures have been experienced, maintenance costs have been high, and in general the type of installation has been unsatisfactory. The general opinion regarding the causes of failure in the internal insulation is that the pressure drop due to the velocity of the fluid flow creates by-passing of the fluid through and in back of the insulation because of porosity and voids in the insulating liner. The by-passing causes high shell metal temperatures and often results in erosion and deterioration of the internal insulation.

According to the present invention this difficulty is eliminated by providing a solid metal cylindrical liner between the fluid space and the insulation and sealing the liner to the steel shell at some point along its length to prevent the circulation of fluid between the liner and the shell. The provision of such a seal introduces difficulties arising out of the expansion and contraction of the liner with temperature changes to a degree different from that manifested by the shell itself, which is at a lower temperature. It is a particular feature of this invention, therefore, to provide a seal in the form of a frusto-conical skirt welded directly to the liner and to the shell and to leave the liner otherwise free of connection with the shell, thereby providing for both radial and longitudinal expansion of the liner. The seal may be made at either end of the liner or at some intermediate point. This seal is referred to as a transition piece because it accommodates itself both to the expansion and contraction of the liner and of the shell.

Another feature of the present invention is the elimination of vertical expansion joints, such as vertical fluting, commonly used in such vessels by making the diameter of the liner sufficiently smaller than the internal diameter of the ceramic insulation to allow for the radial expansion of the liner without crushing of the ceramic lining. It may be noted, however, that this is not an indispensable feature of the present invention, since the use of vertical expansion joints in combination with the transition piece is contemplated.

Still another feature of the present invention is the provision in a chamber of the type referred to of a manhole arrangement which leaves the liner free from direct connection with the shell.

Figure 2:
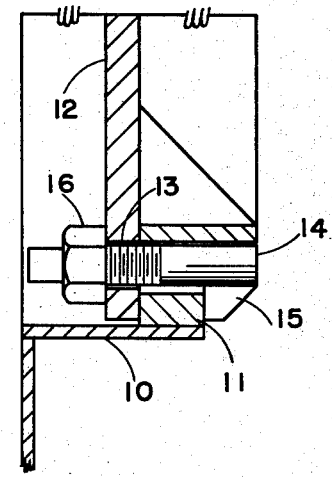

The nature and objects of the present invention will be more clearly understood from the following detailed description of the accompanying drawing, in which Fig. 1 is a vertical section of a wall of a fluid container according to the present invention, and Fig. 2 is an enlarged detail of the manhole construction.

Referring to the drawing in detail, numeral 1 designates the metal shell of the vessel which is lined with a layer 2 of ceramic lining such as refractory cement, fire brick or the like. Mounted inside the ceramic lining is a metal liner 3 in the form of a thin-walled metal cylinder. In the embodiment shown there is a gap 4 in the ceramic liner extending around the vessel, and in this gap is arranged a transition piece 5 of frusto-conical shape having its upper end 6 welded to the shell and its lower end 7 welded to the metal liner. The space in the gap around the transition piece is preferably filled with a compressible insulating material, such as rock wool, powdered magnesia or alumina or lead slag wool. The upper and lower ends of the metal liner are free. It will be observed that this construction permits the leakage of fluid behind the metal liner, but by reason of the transition piece circulation of this fluid is prevented so that any fluid that finds its way behind the liner remains stagnant and causes no damage.

In order to provide access to the interior of the vessel, a manhole 8 of conventional construction is provided on the outer shell. In this manhole is arranged a cylindrical piece 9 extending to the inner surface of the ceramic lining so as to hold the latter in place. Arranged in the metal liner to coincide with the manhole and welded to the liner is a metal ring 10 provided with an inwardly directed flange 11. A metal cover 12 of a size to seat on the flange is provided with bolt holes 13 around its edge. A special bolt 14 having on its inner end a lug 15 adapted to engage the inner face of the flange is arranged in each bolt hole with its threaded end protruding through the plate 12 to receive a nut 16. The cylinder 9 is conventionally filled with insulating material. It will be seen that by removing the manhole cover from the shell and the insulating material from the cylinder 9, the bolts holding plate 12 become readily accessible, while at the same time the construction leaves the liner free from any direct connection with the shell. It may be observed that it is preferable to locate the manhole adjacent a free end of the inner liner so that should there be leakage through the manhole there will be no extensive circulation of fluid as a result thereof.

The nature and objects of the present invention having been fully described and illustrated, what we desire to claim as new and useful and to secure by Letters Patent is:

1. In a container for hot fluids an outer metal shell, an inner metal liner spaced from said shell having at least one of its ends open to permit passage of fluid from inside the liner into the space between the liner and the shell and an imperforate metal plate of frusto-conical shape having one of its ends welded to said shell and the other of its ends welded to said liner, forming a fluid stop in said space.

2. In a container for hot fluid an external metal shell, a frusto-conical imperforate metal skirt having one of its ends welded to said metal shell around the inner circumference thereof intermediate its ends and a metal cylindrical liner spaced from said shell and having at least one of its ends open to permit passage of fluid from inside said liner into the space between said liner and shell, said liner being welded to the other end of said frusto-conical skirt and otherwise free from connection with said shell.

3. A container according to claim 2 in which the space between the shell and the metal liner contains insulating material.

4. A container according to claim 2 in which the outer shell is provided with a manhole and the liner is provided with a corresponding hole and with means independent of the shell for sealing said hole.

5. A container for high temperature fluids comprising a metal shell, a lining of rigid insulating material on said shell, a circumferential gap in said lining intermediate its ends, an imperforate metal plate of frusto-conical shape arranged in said gap having its large diameter end welded to said shell, and an inner metal liner normally spaced from said insulating lining and having at lease one open end permitting the passage of fluid from the inside of said liner into the space between said liner and said lining welded to the small diameter end of said skirt and otherwise free from a connection with said shell.

6. A container according to claim 5 in which the circumferential gap in the insulating lining is packed with a resilient insulating material.

JOHN G. TRAXLER.
PAUL JOHN, Jr.